June 6, 1939.   T. E. HAMSON   2,161,656
COMBINATION FOOT AND ACCELERATOR PEDAL
Filed Sept. 14, 1936    2 Sheets-Sheet 2
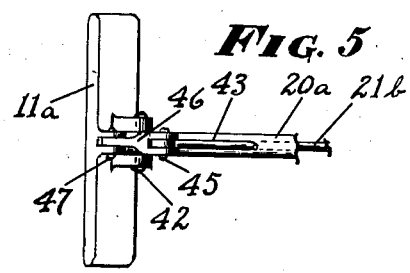
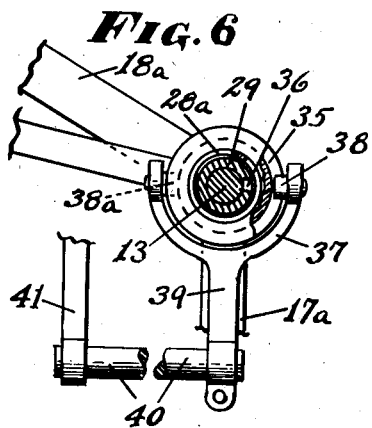
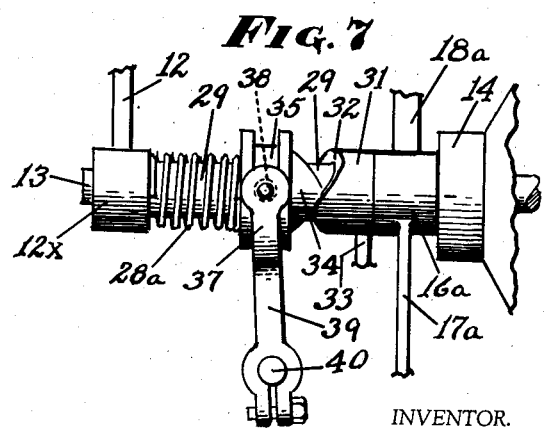
INVENTOR.
Thomas E. Hamson
BY
M. Y. Charles
ATTORNEY.

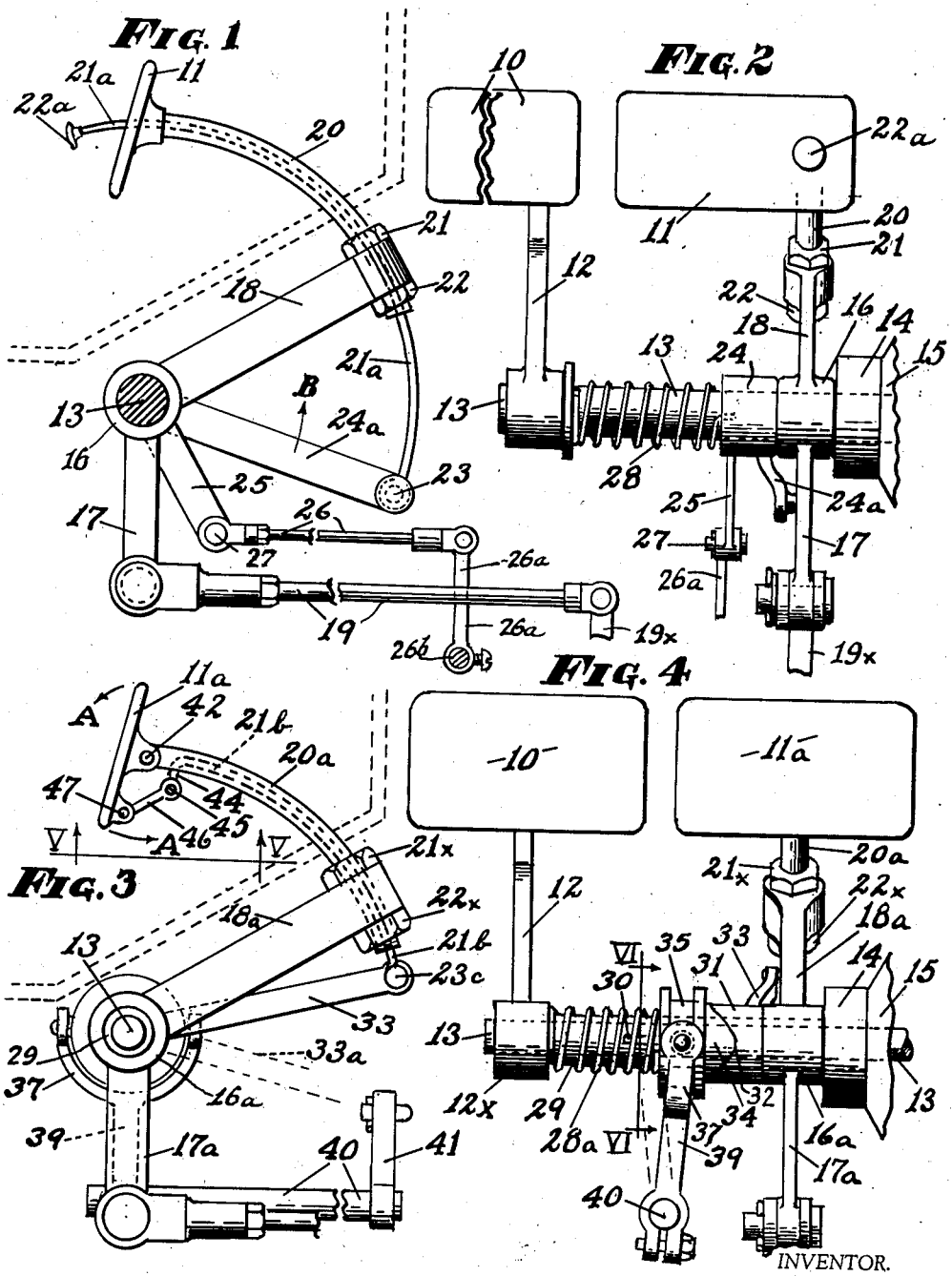

Patented June 6, 1939

2,161,656

UNITED STATES PATENT OFFICE 2,161,656

COMBINATION FOOT AND ACCELERATOR PEDAL

Thomas E. Hamson, Wichita, Kans.

Application September 14, 1936, Serial No. 100,703

3 Claims. (Cl. 192—3)

My invention relates to an improvement in combination foot pedals commonly used in automobiles and the like.

Usually in automobiles is found the well known clutch pedal, brake pedal and accelerator pedal. The brake pedal and accelerator pedal are usually operated by the right foot. Ordinarily the accelerator pedal is positioned closer to the floor board of the car than the foot piece of the brake pedal, therefore in stopping or slowing down the car, it is necessary for the driver of the car to raise his foot from the accelerator pedal to the level of the brake pedal and then move his foot side ways over the brake pedal in order to push the pedal downward to put on the brake. It is lost motion and a consumption of time to raise one's foot and move it side ways as above described and in cases of emergency, it is this lost motion and consumption of time that often results in accidents. In view of this difficulty, I have provided the following described device which is designed to eliminate this lost motion and unnecessary loss of time in applying the brakes to the vehicle. These and other objects will be more fully described as this description progresses.

Referring to the accompanying drawings, Fig. 1 is a side view of the pedal arrangements to which my invention has been applied.

Fig. 2 is a front view of the device shown in Fig. 1.

Fig. 3 is a side view of the pedal arrangement to which a modified form of my invention has been applied.

Fig. 4 is a front view of the device as shown in Fig. 3.

Fig. 5 is a view of the mechanism as seen from the line V—V in Fig. 3 and looking in the direction of the arrows.

Fig. 6 is a sectional view of the device as seen from the line VI—VI in Fig. 4 and looking in the direction of the arrows.

Fig. 7 is a front view of the same mechanism as seen in Fig. 4 showing the operating parts in an opposite position from that shown in Fig. 4.

Similar numerals of reference designate the same parts throughout the several figures of the drawings.

In the drawings, Figures 1 and 2, is shown the usual clutch pedal 10 and brake pedal 11. The clutch pedal 10 is rigidly mounted on the lever arm 12 that is rigidly mounted on the clutch operating shaft 13 which is carried in the bearings portion 14 of the clutch case 15.

Revolvably mounted on the shaft 13 is a hub element 16 on which is rigidly mounted a pair of arms 17 and 18. Pivotally attached to the arm 17 is a rod 19 which serves to deliver power to, or actuate the brake shoe operating lever 19x. In the outer end of the lever arm 18 is a hole through which passes the lower end of a hollow pedal supporting element 20. At 21 and 22 are nuts threaded on the element 20 and are adapted to rigidly bind the end of the lever arm 18 therebetween to rigidly hold the element 20 on the lever arm 18. The upper end of the element 20 is rigidly attached to the pedal element 11 so that pressure from a person's foot on the pedal 11 will rock the elements 11, 20, 16 and 17 and 18 to actuate the rod 19 and associated elements to operate the brake shoe operating lever 19x.

At 21a is a rod slidably mounted within the element 20 and projecting from either end of the element 20. The upper end of the rod 21a is provided with a foot button 22a. The lower end of the rod 21a is pivotally attached at the point 23 to a lever arm 24a that is rigidly attached to a hub element 24 that is revolvably mounted on the clutch shaft 13. Rigidly mounted on the hub 24 is a lever arm 25, to which a rod 26 is pivotally attached at a point 27. The rod 26 leads to and is connected with any suitable mechanism such as a lever arm 26a for operating the valve shaft 26b for the control valve in a carburetor on the engine.

At 28 is a spring, wound around the shaft 13, one end of which terminates in the hub 24 and the other end being attached to the shaft 13 in such a manner that the tension of the spring 28 tends to revolve the hub 24 so as to move the lever arms 24a and 25 in the direction of the arrow B.

The operation of this device is as follows; The button 22a may be pressed by the foot of the driver in the usual manner to control the speed of the car, and the foot of the driver may be slipped from the button 22a onto the pedal 11 to press the pedal 11 downwardly to apply the brakes. It is obvious that this arrangement eliminates lost motion and saves time in applying the brake as above mentioned.

In Figs. 3, 4, 5, 6 and 7 is shown a modified form of the device in which is shown the clutch pedal 10 mounted on the lever arm 12 that is rigidly attached to the clutch operating shaft 13.

Revolvably mounted on the shaft 13 and extending from the hub 12x to the bearing portion 14 is a sleeve element 29 that is provided with a slot 30.

Rigidly attached to the sleeve 29 is a hub element 16a, carrying the lever arms 17a and 18a.

At 31 is a sleeve like element having a cam seat 32 therein. The sleeve 31 is provided with a lever arm 33 which is rigidly attached thereto. The sleeve 31 being revolvable on the sleeve 29.

The part 34 is a cam element slidably mounted on the sleeve 29 and provided with a channel 35 for purposes that will be later explained. The cam element 34 is provided with a tongue 36 which is slidably mounted in the slot 30 in the sleeve 29.

At 37 is a yoke element having pins 38 and 38a which are seated in the channel 35. Integrally formed on the yoke 37 is a lever arm 39 which is rigidly mounted on a shaft 40 which is revolvably carried in suitable bearings (not shown) and on the outer end of the shaft 40 is a lever arm 41 to which any suitable device may be attached for operating a control valve in the carburetor of the engine.

At 20a is a hollow element, the lower end of which passes through a hole in the outer end of the lever arm 18a and at 21x and 22x are nuts threaded on the lower end of the element 20a and adapted to bind the outer end of the element 18a therebetween, so as to form a rigid mounting for the hollow element 20a.

At 11a is the brake pedal which is pivotally mounted at the point 42 on the upper end of the element 20a. The element 20a is provided with a slot 43 for purposes that will be later made obvious.

At 21b is a rod slidably mounted in the element 20a, the lower end of which is pivotally mounted at 23c on the lever arm 33. The upper end of the rod 21b is bent downwardly as shown at 44, and projects from the element 20a through the slot 43 and is pivotally connected at the point 45 to a link element 46 which is pivotally attached at the point 47 to the pedal element 11a, so that by rocking the pedal element 11a, the rod 21b will push the lever 33 to a position such as shown by the dotted lines 33a, thereby revolving the element 31 and by the cam association between the elements 31 and 34, the element 34 is pushed sideways to the position shown in Fig. 7.

At 28a is a spring held under compression between the element 12x and the element 34 and functions to press the cam 34 into the cam seat 32 so that as the pedal element 11a is rocked, the lever 39 will be moved backward and forward to rock the lever 41 so as to operate the valve in the carburetor of the engine.

This arrangement provides a device in which a person may always have his foot on the brake pedal so that there will be no lost motion or no unnecessary consumption of time in applying the brake, and the foot pedal 11a, by being rockable, as above described, serves the purpose of an accelator pedal.

It is obvious that this device affords an arrangement in which the brake pedal may be pushed to any desired point in applying the brake and the accelerator will be operated independently of the brake portion of the device, by the rocking of the pedal 11a.

Such modifications of my invention may be employed as lie within the scope of the appended claims without departing from the spirit and intention of the invention. Now having fully described my invention, what I claim as new and desire to secure by Letters Patent is:

1. In a combination foot pedal and accelerator operating device, a supporting shaft, a hub element rigidly mounted on said shaft and rigidly carrying a lever arm and pedal thereon, a second hub element, said second hub element being supported by said supporting shaft and being revolvable around the center axis of said supporting shaft, a pair of lever arms, one end of which is rigidly positioned on the second said hub, the outer end of one of said lever arms on the second said hub having an operating rod pivotally attached thereto, the outer end of the second lever arm on the second said hub having a tubular curved pedal support rigidly carried thereon, said curved pedal support being in the form of an arc whose center is on the center axis of the said supporting shaft, a second foot pedal, said second foot pedal being mounted on the upper end of the tubular curved pedal support, a third hub element, said third hub element being supported by said supporting shaft and being revolvable therearound, a lever arm rigidly fixed on said third hub element, a curved push rod element, said push rod being in the form of an arc whose center is on the center axis of the said supporting shaft, said push rod being slidably carried in said tubular curved pedal support, the lower end of said push rod being pivotally connected to the outer end of the lever arm on the third said hub element, and means at the upper end of said push rod for sliding said push rod in said tubular curved pedal support to effect a rotary motion of the third said hub element, a second operating shaft, and means intermediate said second operating shaft and the third said hub element for imparting motion to the second said operating shaft, and spring means around said supporting shaft to return the said second operating shaft to its original position.

2. In a combination foot pedal and accelerator device; said device comprising a supporting shaft having a pedal lever rigidly mounted on the outer end thereof; a hub element, said hub element being revolvably mounted on said supporting shaft, said hub element having two lever arms integrally formed thereon, one of said lever arms having an operating rod pivotally attached thereto, the outer end of the other lever arm having a tubular pedal support rigidly carried thereon, said pedal support being curved in the form of an arc whose center is on the center axis of the said supporting shaft, a foot pedal, said foot pedal being rigidly mounted on the upper end of the curved pedal support, a second hub element, said second hub element being revolvably mounted on the said supporting shaft and between the hub of the first said pedal and the first said hub, a helical spring, said spring being positioned around the said shaft with one end of the spring attached to the second said hub and the other end of the spring being stationed with the said shaft, said spring being so tensioned as to urge rotation of the second said hub on the supporting shaft, a pair of lever arms integrally formed on the second said hub element, a curved accelerator foot push rod, said push rod being in the form of an arc whose center lies on the center axis of the said supporting shaft, said push rod being slidably positioned within the said curved pedal support and one end thereof passing through and projecting beyond the pedal element on the curved pedal support, the other end of said push rod projecting from the lower end of said curved pedal support and pivotally connecting to the outer end of one of the lever arms on the second said hub, the outer end of the other lever arm on the second said hub having an operating rod pivotally attached thereto for the purpose described.

3. In a combination foot pedal and accelerator operating device; a supporting shaft, a hub rigidly mounted on said supporting shaft, said hub having a lever rigidly fixed thereon, said lever supporting a foot pedal whereby the supporting shaft may be revolved by pressure being applied to said pedal; a sleeve rotatably mounted on said supporting shaft, and a second hub element rigidly mounted on said sleeve, said second hub having a pair of lever arms rigidly fixed thereon, the outer end of the first of said levers on the second said hub element having a brake operating shaft pivotally connected thereto, the outer end of the second of said levers on the second said hub element supporting a tubular curved pedal supporting element, said curved pedal supporting element being in the form of an arc whose center lies in the center axis of the said supporting shaft, a second foot pedal, said second foot pedal being rockably mounted on the said tubular curved pedal supporting element, a cam hub element, said cam hub element being revolvably mounted on the said sleeve element intermediate the first and second said hub elements, a lever arm rigidly fixed on said cam hub element, a curved push rod, said curved push rod being in the form of an arc whose center is in the center axis of said supporting shaft, said push rod being slidably positioned in said curved pedal supporting element, one end of said push rod being linked to the second said pedal, and the other end of said push rod being pivotally connected to the outer end of the lever arm on the cam hub element so that by rocking the pedal on the curved pedal support the push rod will be slipped in the curved pedal support so as to actuate the lever arm on the cam hub to rotate the cam hub on the said sleeve, a channeled cam element, said channeled cam element being slidable longitudinally and non-rotatably mounted on said sleeve and intermediate the first said hub element and the cam hub element, and spring means for urging movement of the channeled cam element against the cam hub element, a rotatable operating shaft, one end of said rotatable shaft having a lever arm rigidly mounted thereon, one end of the lever arm on the rotatable shaft engaging in the channel in said channeled cam element so that upon the longitudinal movement of the channeled cam element on the said sleeve the lever arm on the rotatable operating shaft will be rocked so as to impart a rotatable movement to said rotatable shaft as and for the purpose described.

THOMAS E. HAMSON.